(12) United States Patent
Hu

(10) Patent No.: US 6,259,477 B1
(45) Date of Patent: Jul. 10, 2001

(54) JOINT SPATIAL-TEMPORAL ALIGNMENT OF VIDEO SEQUENCES

(75) Inventor: Shane Ching-Feng Hu, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/103,669

(22) Filed: Jun. 23, 1998

(51) Int. Cl.⁷ ............................................. H04N 17/00
(52) U.S. Cl. ..................... 348/180; 348/181; 348/189; 348/192
(58) Field of Search ..................... 348/177, 180, 348/181, 187, 189, 190, 192, 185, 518, 519; 327/149, 152, 153, 161; H04N 17/00, 17/02

(56) References Cited

U.S. PATENT DOCUMENTS

| | | | |
|---|---|---|---|
| 5,309,376 | * 5/1994 | Barraco et al. | 348/180 |
| 5,446,492 | * 8/1995 | Wolf et al. | 348/192 |
| 5,602,586 | * 2/1997 | Schauer et al. | 348/189 |
| 5,764,284 | * 6/1998 | Stoker | 348/181 |
| 5,818,520 | * 10/1998 | Janko et al. | 348/192 |
| 5,894,324 | * 4/1999 | Overton | 348/181 |
| 5,940,124 | * 8/1999 | Janko et al. | 348/189 |

* cited by examiner

Primary Examiner—John K. Peng
Assistant Examiner—Jean W. Désir
(74) Attorney, Agent, or Firm—Francis I. Gray

(57) ABSTRACT

A joint spatial-temporal alignment of video sequences uses a subsampled version of a reference video sequence for correlation with a corresponding subsampled version of a test video sequence in an iterative manner. The subsampled reference video sequence is obtained by detecting a temporal transition field in the reference video sequence, and then selecting a pair of fields from the reference video sequence that straddle the transition field separated by a given number of fields (time interval). Then starting from a current field of the test video sequence a pair of fields is selected separated by the same number of fields and correlated with the subsampled reference video sequence. If the correlation criteria are not satisfied, the current field in the test video sequence is incremented by one and the correlation process repeated until spatial-temporal alignment is achieved.

1 Claim, 1 Drawing Sheet

JOINT SPATIAL-TEMPORAL ALIGNMENT OF VIDEO SEQUENCES

BACKGROUND OF THE INVENTION

The present invention relates to the testing of video signals, and more particularly to a joint spatial-temporal alignment of video sequences that aligns a test video signal with a reference video signal for testing video fidelity.

In video processing and/or transmission systems temporal latency and spatial shift may be introduced into the video signal. An example is a video transmission system using MPEG-2 compression for bandwidth reduction and digital bit stream transport. In order to test video signal fidelity of a video processing system, it is necessary to accurately align the signal under test to that of an original reference signal both spatially and temporally. The alignment task includes spatial and temporal shift detection and correction. A video sequence has sampled images equally spaced in time. For interlaced video each sampled image is called a video field.

There are many alignment methods for two-dimensional images, such as the well-known phase correlation method for spatial shift detection, as discussed in "The Phase Correlation Image Alignment Method" by C. D. Kuglin and D. C. Hines, Jr. in the Proceedings of the IEEE 1975 International Conference on Cybernetics and Society, September 1975, pp. 163–165. The phase correlation method is based upon the fact that most of the information about the alignment between two images is contained in the phase of their cross-power spectrum. The discrete phase correlation function is obtained by first computing the discrete two-dimensional Fourier transforms, F1 and F2, of two sampled images, calculating the cross-power spectrum and extracting its phase for each frequency bin. The phase array is calculated by multiplying Fourier transform F1 and the conjugate of F2, and dividing by the magnitude of the product. By performing inverse Fourier transform of the phase array, a phase correlation surface is obtained.

The location of the peak of the phase correlation surface provides information about the amount of the spatial shift between the two images: the height of the peak corresponds to the similarity of the two images. As an example of an ideal case, an image is shifted by a vector translation S, and equation (2) from the Kuglin et al article yields a unit height delta function centered at the location S of the correlation surface. For fractional pixel shift some form of curve fitting around the peak may be used to refine the peak location to fractional pixel precision.

The phase correlation alignment method provides a basic tool for solving the problem of spatial-temporal alignment of video sequences. To detect spatial-temporal shift of the video sequences relative to each other, the ambiguities of spatial shift or temporal shift uncertainties that exist in certain video signals need to be considered. For example temporal shift may not be determined with certainty for static scenes. For video captured by perfect camera panning, the shift may be caused by either temporal or spatial shift. The ambiguity may be resolved only when significant spatial-temporal changes occur in the video sequences.

What is desired is a joint spatial-temporal alignment of video sequences that resolves in a robust way the inherent ambiguities possible in the video sequences.

SUMMARY OF THE INVENTION

Accordingly the present invention provides a joint spatial-temporal alignment of video sequences. Using a well-known phase correlation method for spatial shift a video field is detected where a temporal transition takes place by the sudden drop of correlation peak of the neighboring fields of the reference sequence. Two fields from the reference sequence are selected that straddle the transitional field, which serves as the basis for the joint spatial-temporal alignment detection. A field pair from the test sequence having the same temporal distance as the reference field pair is used to perform spatial alignment against the reference pair. The temporal alignment is found if the spatial shifts for the two pairs are the same and the sum of the correlation peaks exceed a certain minimum. In this way spatial and temporal alignment detection is carried out simultaneously, achieving economy of computation and reduction of ambiguities of spatial versus temporal alignment detection.

The objects, advantages and other novel features of the present invention are apparent from the following detailed description when read in conjunction with the appended claims and attached drawing.

DETAILED DESCRIPTION OF THE INVENTION

Figure 1:
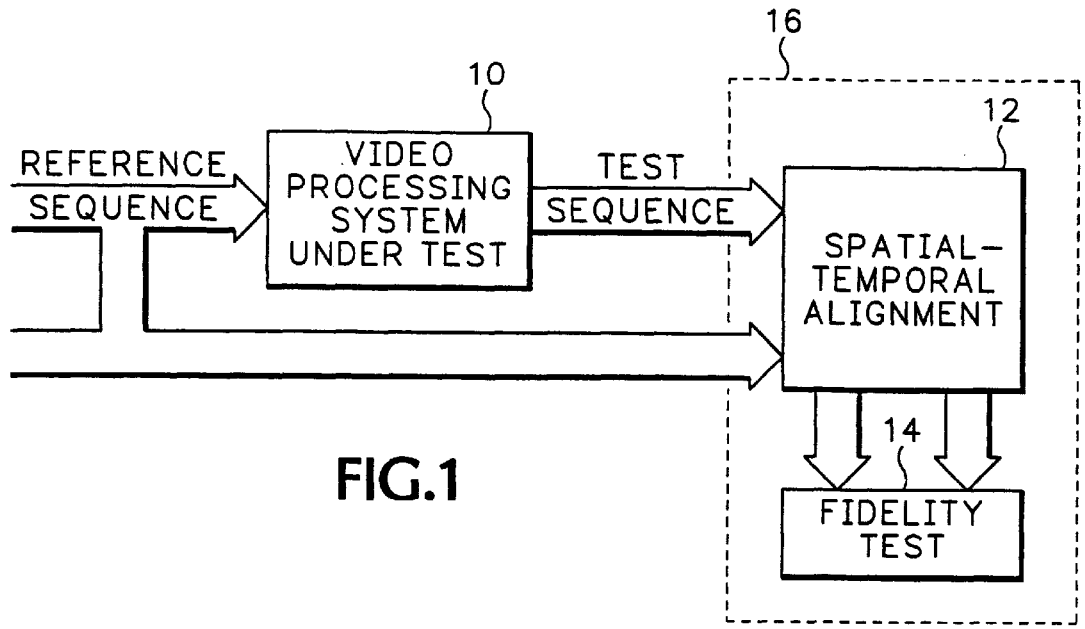
FIG. 1 is a block diagram view of a system for testing a video processing system using joint spatial-temporal alignment according to the present invention.

Referring now to FIG. 1 a reference video sequence is input to a video processing system under test (SUT) 10 and to a spatial-temporal alignment processor 12. The output from the video processing system under test 10 is a test video sequence that also is input to the spatial-temporal alignment processor 12. The reference and test video sequences are output from the spatial-temporal alignment processor 12, corrected for any spatial-temporal misalignment, and input to a fidelity test processor 14. The fidelity test processor 14 provides an analysis of the degradation of the test video sequence from the reference video sequence caused by the video processing system under test 10. The spatial-temporal alignment processor 12 and fidelity test processor 14 may be part of a test and measurement instrument 16, such as the PQA200 manufactured by Tektronix, Inc. of Wilsonville, Oreg., USA.

To solve the potential spatial-temporal ambiguities that may exist in the video signal, the first step is to find a video field R(T) in the reference sequence which contains a significant temporal transition. The temporal transition in the time domain is analogous to an edge signal in the spatial domain. By calculating phase correlation across neighboring fields in the reference, a sudden drop of the correlation peak magnitude indicates that a temporal transition has taken place. The transition may be due to switching from one camera to another in a multi-camera production, or some other scene change in the video signal.

Figure 2A:
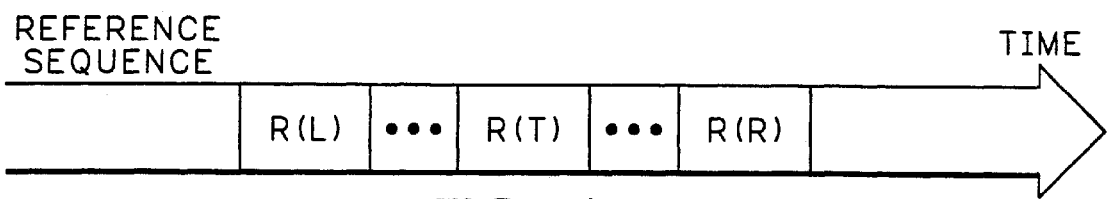
FIG. 2 is an illustrative view of the joint spatial-temporal alignment of video sequences according to the present invention.

Instead of trying to correlate the whole or a long part of the reference and test video sequences, the reference video sequence is shrunk to two fields, R(L) and R(R), that bracket the transition field R(T), as shown in FIG. 2A. In fact the two fields form a subsampled video sequence from the original reference video sequence.

Figure 2B:
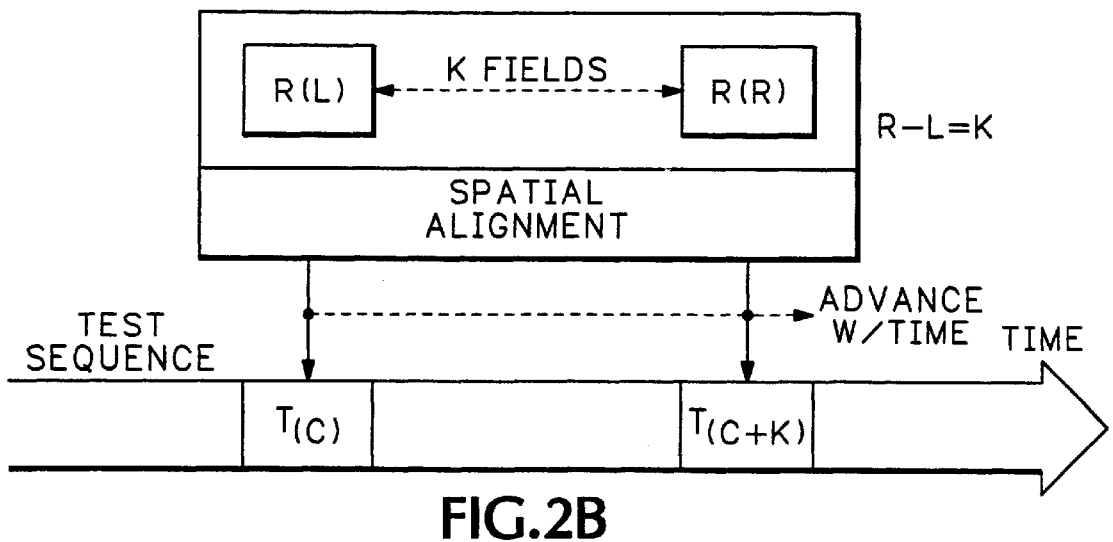

As represented in FIG. 2B, the following operations are carried out repeatedly from the start of the test sequence until spatial and temporal shifts are found:

(1) Two video fields, T(C) and T(C+K), from the test sequence with the same temporal distance K as between R(L) and R(R) are selected from a current field position T(C) and paired with the subsampled, two field, reference video sequence in temporal order—the early field R(L) of the reference pair of fields is paired with the early field T(C) of the test pair of fields, and vice versa.

(2) Spatial alignment is calculated for each pair to find the spatial shift and correlation magnitude.

(3) If the spatial shifts are the same for the two pairs and the sum of the correlation magnitudes exceed a minimum threshold, then spatial-temporal alignment is achieved. Spatial shift has already been calculated and the temporal shift is found by the difference of the time codes between the respective reference and test field pairs. If the spatial-temporal alignment is not successful, then the test cycle repeats to step (1) with the advancement of the current position of the test sequence pair by one field.

Thus the present invention provides a joint spatial-temporal alignment of video sequences by detecting a transition field in a reference video sequence corresponding to a scene change, selecting a pair of reference fields straddling the transition field as a subsampled reference sequence, and iteratively comparing two fields from a test sequence space apart by the same time as the reference sequence fields until spatial-temporal alignment is achieved.

What is claimed is:

1. A method of joint spatial-temporal alignment of a reference video sequence with a test video sequence comprising the steps of:

detecting a temporal transition field in the reference video sequence;

selecting as a subsampled reference video sequence a pair of fields from the reference video sequence that straddle the transition field separated by a given time interval;

iteratively correlating a pair of fields from the test video sequence that are spaced apart by the given time interval with the subsampled reference video sequence, incrementing the pair of fields from the test video sequence by one after each iteration until spatial-temporal alignment is achieved.

* * * * *